United States Patent [19]

Holderegger et al.

[11] Patent Number: 4,528,127
[45] Date of Patent: Jul. 9, 1985

[54] COMPOSITION FOR COATING A SUBSTRATE WITH AN EPOXY RESIN POWDER COATING AND A METHOD OF MAKING MATT FINISHES WITH THE COMPOSITION

[75] Inventors: Rolf Holderegger, Thalwil; Josef H. Jilek, Wadenswil, both of Switzerland

[73] Assignee: The Dow Chemical Company, Midland, Mich.

[21] Appl. No.: 639,613

[22] Filed: Aug. 10, 1984

Related U.S. Application Data

[63] Continuation of Ser. No. 405,967, Aug. 6, 1982, abandoned.

[51] Int. Cl.³ .............................................. C08G 59/42
[52] U.S. Cl. .................... 525/530; 525/934; 527/601; 528/112; 528/113; 528/365
[58] Field of Search ............... 525/530, 934; 527/601; 528/112, 365, 113

[56] References Cited

U.S. PATENT DOCUMENTS 2,947,711 8/1960 Cooke et al. .................. 528/112 X
3,582,509 6/1971 Staniak et al. .................. 528/112 X
3,812,064 5/1974 Nichols ............................ 528/86 X
3,842,035 10/1974 Klaren ......................... 260/47 EN

FOREIGN PATENT DOCUMENTS 0015035 9/1980 European Pat. Off. .

OTHER PUBLICATIONS

Kuczynskaya et al., "Effect of Crosslinking Agents on the Properties of Powdered Epoxy Paints", International Polymer Science and Technology, 7, T93–T96 (1980).

*Primary Examiner*—Earl Nielsen

[57] ABSTRACT

This invention is directed to a composition for coating a substrate with a powder coating and to a method of making matt finishes. The composition comprises a solid polyepoxide resin, a solid curing agent in which at least 50 weight percent of the curing agent is a 1:1 mole ratio adduct of rosin and maleic anhydride, a catalyst for promoting the reaction between the polyepoxide and the curing agent, and a pigment. The method of making matt finishes comprises (1) applying to a surface the above-described composition and (2) curing the mixture at a temperature from 140° to 250° C.

4 Claims, No Drawings
}

COMPOSITION FOR COATING A SUBSTRATE WITH AN EPOXY RESIN POWDER COATING AND A METHOD OF MAKING MATT FINISHES WITH THE COMPOSITION

CROSS-REFERENCE TO RELATED APPLICATION

This is a continuation of application Ser. No. 405,967 filed Aug. 6, 1982, now abandoned.

BACKGROUND OF THE INVENTION

Epoxy resin powder coating compositions which are capable of being crosslinked by a variety of agents which effect such crosslinking are well known. The prior art contains numerous references to compositions, which contain epoxy resins and crosslinking agents such as amine, acid anhydrides, boron trifluoride complexes, polyaminoamides, dicyandiamide or substituted dicyandiamides. However, these powder coating compositions yield cured coatings having high gloss. For certain decorative applications, it is desirable to have powder coating compositions that upon curing produce low or semi-gloss finishes that avoid unsuitable light reflections.

It is known that matt finishes can be produced from powder coating compositions in which the binder, pigment, and a matting agent such as micro-fine silicic acid or talcum have been dry-blended. But differences in specific gravity of the dry-blended components, as well as differences in the pick-up by the surface to be coated cause unacceptably large variations in the gloss level of the cured coating.

In U.S. Pat. No. 3,842,035, it was found that a coating having a matt finish can be obtained by using a powder coating composition which is a mixture of two separately prepared heat curable, thermosetting powder coating compositions. One is a slow curing composition and the other is a fast curing composition. The binder components of the two compositions are compatible. When each of the two powder coating compositions is applied separately and cured, a glossy coating results. With this approach, no matting agent is required, but other problems exist, such as dry-blending large amounts of finished powders and the composition of the over spray.

German Pat. No. 2,324,696 teaches a method for making matt coatings by applying to a surface a finely divided mixture of a solid polyepoxide resin and at least one salt of a polycarboxylic acid with three or more carboxyl groups, such as pyromellitic acid, and cyclic amidines, such as 2-phenylimidazoline, and curing the mixture at a temperature of 160° to 240° C.

It has been found that matt finishes having good mar resistance can be produced from epoxy resin powder coating compositions containing an adduct of rosin and maleic anhydride.

SUMMARY OF THE INVENTION

This invention is directed to a composition for coating a substrate with a powder coating comprising a solid polyepoxide resin, a solid curing agent, a catalyst for promoting the reaction between the polyepoxide and the curing agent, and a pigment wherein at least 50 weight percent of the curing agent is a 1:1 mole ratio adduct of rosin and maleic anhydride. This invention is also directed to a method of applying a matt finish comprising (1) applying to a surface a finely divided mixture of a solid polyepoxide, a solid curing agent, a catalyst for promoting the reaction between the polyepoxide and the curing agent, and a pigment and (2) curing the mixture at a temperature of from 140° to 250° C. wherein at least 50 weight percent of the curing agent is a 1:1 mole ratio adduct of rosin and maleic anhydride. Preferably the curing agent comprises from 50 to 85 weight percent of the rosin/maleic anhydride adduct and from 50 to 15 weight percent dicyandiamide. More preferably, the curing agent comprises from 65 to 80 weight percent of the rosin/maleic anhydride adduct and from 35 to 20 weight percent dicyandiamide.

DETAILED DESCRIPTION OF THE INVENTION

It has been well established that suitable polyepoxide resins are 1,2-epoxy compounds having more than one 1,2-epoxy group in the molecular and a lower softening point of not less than 40° C.

Particularly suitable polyepoxide resins are of the epichlorohydrin/bisphenol A type having the formula:

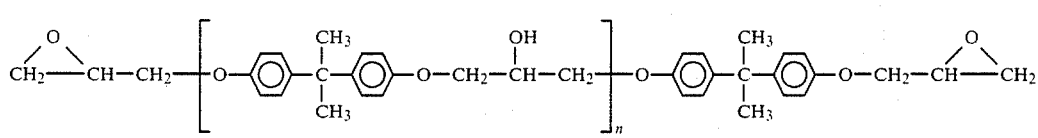

where n is sufficiently large to have an epoxy equivalent weight of from 400 to 1000, preferably 600 to 900. These polyepoxide resins may be used alone or in combination with epoxy/epoxy novolac resins. Such a resin is an epichlorohydrin/bisphenol A resin of the formula shown above modified with an epoxy novolac resin of the formula:

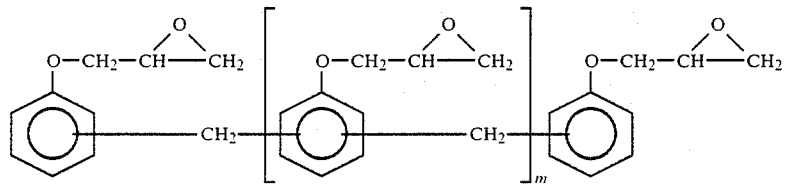

where n of the epoxy resin and m of the epoxy novolac resin have values sufficiently large to provide an epoxy/epoxy novolac resin having an epoxy equivalent weight of from 400 to 900, preferably 500 to 600.

Epoxy/epoxy novolac resins are formed by modifying an epichlorohydrin/bisphenol A resin with an epoxy novolac resin of the type shown in U.S. Pat. No. 2,685,885. By varying the ratio of epichlorohydrin/bisphenol A epoxy to epoxy novolac, the epoxide equivalent weight can be varied and epoxy/epoxy novolac resins of different reactivity can be provided.

Suitable curing or crosslinking agents well known in the art include, for example, amines, acid anhydrides, boron trifluoride complexes, polyaminoamides, dicyandiamide and substituted dicyandiamides. For this invention, dicyandiamide is preferred.

In order for the powder coating composition of this invention to provide a matt finish on the surface of the article coated, it is required that two different curing agents be present and at least 50 weight percent of the curing agent mixture is a 1:1 mole ratio adduct of rosin and maleic anhydride. U.S. Pat. No. 2,947,711 teaches the use of a 1:1 mole ratio adduct of rosin and maleic anhydride as a curing agent for liquid epoxy resin coating formulations that were drawn on glass and cured at 150° C. There was no recognition in this reference that the rosin/maleic anhydride adduct would impart a matt-to-semi-glossy finish when employed in epoxy resin powder coating formulations.

The chief component of rosin are resin acids known as diterpene carboxylic acids. The eight individual resin acids which occur in rosin have one or two parent structures, i.e., abietic-type or pimaric-type. Of the abietic-type structure, abietic acid is the chief constituent of commercial rosins. Levopimaric acid is isomerized almost completely to abietic acid by acid or heat. Levopimaric acid is the only one which has the cis-configuration of the two double bonds and, therefore, is the only one which reacts readily with dienophiles such as maleic anhydride. In the reaction of rosin with maleic anhydride, levopimaric acid is present in small amounts in equilibrium with the other two double bond abietic-type acids, abietic acid and neoabietic acid and, as it reacts, the equilibrium is shifted to consume all of the double bond abietic-type acids to give the levopimaric acid-maleic anhydride adduct. The remaining three abietic-type acids: dehydroabietic acid, dihydroabietic acid and tetrahydroabietic acid are less reactive acids. The two pimaric-type acids are dextropimaric acid and isodextropimaric acid. These two acids are relatively stable to heat and acid isomerization and to oxidation, presumably because the double bonds are not conjugated.

The preferred rosin/maleic anhydride adduct is prepared from tall oil rosin, which contains approximately 42 weight percent abietic acid. It has been found that the 1:1 mole ratio adduct of abietic acid and maleic anhydride produces only a slight matt surface when incorporated in powder coating compositions. The curing agent mixture is employed in the powder coating composition in the range of 5 to 15 weight percent, preferably 6 to 12 weight percent, based on the powder coating formulation.

Suitable catalysts or accelerators for promoting the reaction between the polyepoxide resin and the curing agent include, for example, quaternary ammonium compounds, quaternary phosphonium compounds, oxazines, oxazolines, imidazoles and imidazolines which are well known in the art. Preferably, the catalysts are substituted imidazoles, with 2-methylimidazole being the most preferred. Catalysts are employed in the range from 0.05 to 0.5 weight percent of the powder coating formulation. Preferably, 0.01 to 0.4 percent by weight of the catalyst is used.

Flow control agents can be added to the powder coating composition of this invention in amounts of 0.01 to 1.0 weight percent. Typical flow control agents are polyacrylates, such as poly-2-ethylhexyl acrylate, finely divided ethyl cellulose, and siloxanes, such as dimethyl polysiloxanes or methyl phenyl polysiloxanes.

To improve the handling properties of the powder coating composition and to prevent caking, finely divided silica in the amounts of 0.05 to 0.5 percent by weight can be added. The silica can be blended with any of the epoxy resins or with the curing agent and/or the catalyst. The silica is preferably fumed silica. This is a very fine, amorphous silica formed from silica spheres having an average diameter of 7 to 14 millimicrons. A suitable substance for this purpose is commercially available under the trademark Cab-O-Sil ® registered to Cabot Corporation.

The composition can be pigmented or unpigmented but is usually pigmented and contains pigments in a pigment/binder ratio of 2/100 to 80/100. Any of the conventional inorganic or organic pigments, filler pigments, or dyes can be used. Examples of the great variety of useable pigments include: metallic oxides, such as titanium dioxide, zinc oxide, and iron oxide; metallic flakes such as aluminum flake; metallic powders; metal hydroxides; pigments such as mica flake coated with titanium dioxide; sulfides; sulfates; carbonates; carbon black; silica; talc; china clay; and other extender pigments.

One method for forming the powder coating composition of this invention is to blend the components together and then pass the mixture through a conventional extruder. The extrudate can then be reduced to a powder using conventional grinding equipment. After grinding, the powder is passed through a sieve to remove particles larger than 110 μm. Preferably, a sieve which eliminates the particles of maximum dimension greater than 75 μm is used.

The powder coating composition of this invention can be applied to a metal, glass, plastic, or a fiber-reinforced plastic substrate by electrostatic spraying or by using a fluidized bed which can be electrostatic. Preferably, electrostatic spraying is used in which a voltage of 20 to 100 kilovolts is applied to the spray gun. The composition can be applied in one pass or several passes to provide variable thickness after cure of 0.01 to 0.50 mm, preferably 0.04 to 0.10 mm. After the application of the powder, the coated article is heated at 140° to 250° C. for 6 to 20 minutes to fuse and to cure the powder particles into a substantially continuous uniform coating.

The powder coating composition can be applied directly to untreated metals such as aluminum or steel. The coating composition can also be applied over a suitably treated or primed metal substrate. Typical conventional alkyd primers or epoxy primers pigmented with, for example, iron oxide, carbon black, and titanium dioxide, can be used. Electrodeposited primers can also be used. The composition can be used directly over galvanized phosphatized steel to form a durable coating. An electrically conductive carbon black pigment can be added to the primer to make the surface conductive and to promote uniform deposition of the powder while spraying.

The following Examples illustrate the invention. All quantities are on a weight basis unless otherwise indicated.

EXAMPLES 1 THROUGH 8 AND COMPARATIVE RUN A

The following components were employed in preparing the powder coating compositions for the Examples and Comparative Run.

Epoxy Resin A was an epichlorohydrin/bisphenol A type resin as described earlier having an epoxy equivalent weight of 785 and a Durran's softening point of 93° C. This resin is commercially available from The Dow Chemical Company as D.E.R. ®663U. A portion of Epoxy Resin A contained 5 weight percent of a polyacrylate flow control agent which is commercially available from The Monsanto Company as Modaflow ®. The resin containing the flow control agent is commercially available from The Dow Chemical Company as D.E.R. ®673MF. The proportion of flow control agent in the powder coating formulation determines the proportion of Epoxy Resin A containing the flow control agent that is required.

Epoxy Resin B is an epoxy/epoxy novolac resin which is an epichlorohydrin/bisphenol A type resin similar to Epoxy Resin A modified with an epoxy novolac resin as described earlier. Epoxy Resin B had an epoxy equivalent weight of 538 and a Durran's softening point of 90° C. This resin is commercially available from The Down Chemical Company as D.E.R. ®642U.

Rosin/Maleic Anhydride Adduct C was a 1:1 mole ratio adduct of tall oil rosin containing 42 weight percent abietic acid and maleic anhydride. The adduct had a melting point of 130° C. and an acid number of 296.

Abietic Acid/Maleic Anhydride Adduct D was a 1:1 mole ratio adduct of abietic acid and maleic anhydride which was prepared by heating 600 g of abietic acid with 200 g of maleic anhydride for 3 hours at 170° C. It had an acid number of 300.

The second curing agent was dicyandiamide available from American Cyanamid. The pigment was titanium dioxide, available from Kronos as CL-220 and Imperial Chemical Industries as RTC-4. The flow control agent was Modaflow ® available from The Monsanto Company. The finely divided silica was Aerosil 200 available from Degussa. The catalyst was 2-methylimidazole.

Dicyandiamide, 2-methylimidazole and the finely divided silica were premixed in two formulations. The first formulation contained 82 weight percent dicyandiamide, 17 weight percent 2-methylimidazole, and 1 weight percent finely divided silica. The second premixed formulation contained 89 weight percent dicyandiamide, 10 weight percent 2-methylimidazole, and 1 weight percent finely divided silica. The first premixed formulation was employed in Examples 1 to 4 and 6 to 8 and in Comparative Run A. The second premixed formulation was employed in Example 5. An additional 25 grams of dicyandiamide was added to Examples 2 to 8 and Comparative Run A.

The components of the powder coating compositions of Examples 1 to 8 and Comparative Run A were blended together, melt extruded at a temperature between 90° and 96° C., milled to a powder and sieved to remove particles bigger than 75 μm. The best results were obtained by mixing the second premixed formulation containing dicyandiamide, 2-methylimidazole and finely divided silica with the rosin/maleic anhydride adduct. This mixture was then milled to a size of about 50 μm before mixing with the rest of the components.

The formulated powder coating compositions were sprayed electrostatically onto degreased steel panels 15 cm by 7 cm by 0.6 mm thick, and cured at 180° C. for a time between 14 and 30 minutes. The 60° gloss was measured according to ASTM-D-523-67. The front-/reverse impact strength was measured according to ASTM-D-2794-69. Adhesion was measured according to DIN-53151.

The formulations for Examples 1 to 8 and Comparative Run A and Test Results are stated in Table I.

TABLE I

| Formulation (Parts by Weight) | Ex. 1 | Ex. 2 | Ex. 3 | Comparative Run A | Ex. 4 | Ex. 5 | Ex. 6 | Ex. 7 | Ex. 8 | Comparative Run B |
|---|---|---|---|---|---|---|---|---|---|---|
| Epoxy Resin A | 71.25 | 71.25 | 71.25 | 71.25 | 190 | 190 | 190 | 1060 | 71.25 | 71.25 |
| Epoxy Resin B | 1020 | 995 | 1085 | 995 | 870 | 870 | 870 | 0 | 995 | 1075 |
| Rosin/Maleic Anhydride Adduct C | 180 | 180 | 90 | 0 | 180 | 180 | 180 | 180 | 180 | 0 |
| Abietic Acid/Maleic Anhydride Adduct D | 0 | 0 | 0 | 180 | 0 | 0 | 0 | 0 | 0 | 0 |
| Dicyandiamide | 22.25 | 47.25 | 47.25 | 47.25 | 47.25 | 45.50 | 44.50 | 44.50 | 44.50 | 47.25 |
| 2-Methylimidazole | 2.5 | 2.5 | 2.5 | 2.5 | 2.5 | 4.25 | 5.0 | 5.0 | 5.0 | 2.5 |
| Titanium Dioxide | 700 | 700 | 700 | 700 | 700 | 700 | 700 | 700 | 700 | 800 |
| Flow Control Agent E | 3.75 | 3.75 | 3.75 | 3.75 | 10 | 10 | 10 | 10 | 3.75 | 3.75 |
| Finely Divided Silica | 0.25 | 0.25 | 0.25 | 0.25 | 0.25 | 0.25 | 0.50 | 0.50 | 0.50 | 0.25 |
| Stoving Time at 180° C., min. | 17 | 17 | 17 | 18 | 17 | 18 | 16 | 18 | 17 | 14 |
| Film Thickness, μm | 60 | 90 | 90 | 70 | 60 | 80 | 60 | 70 | 50 | 70 |
| Flow | Good | Good | Good | Good | Good | Good | Good | Good | Good | Good |
| 60° Gloss, % | 15 | 15 | 30 | 80 | 30 | 25 | 30 | 45 | 15 | 98 |
| Impact, Front-/Reverse, in-lb (m-kg) | 20/10 (0.23/0.12) | 20/0 (0.23/0) | 20/0 (0.231/0) | 30/15 (0.35/0.17) | 40/20 (0.46/0.23) | Poor | 30/20 (0.35/0.23) | 20/10 (0.23/0.12) | 30/8 (0.35/0.09) | 130/115 (1.50/1.32) |
| Adhesion | Good | Good | Good | Good | Good | Good | Good | Good | Good | Good |
| Acetone Rubs | 3-4 | 3-4 | 3-4 | >20 | 3-4 | 2-3 | 3-4 | 3-4 | 6-8 | >20 |
| Gel Time at 180° C., sec. | 80 | 70 | 90 | 60 | 70 | 60 | 60 | 90 | 60 | 65 |

What is claimed is:

1. A composition for coating a substrate with a powder coating composition comprising a solid polyepoxide resin, two different curing agents, a catalyst for promoting the reaction between the polyepoxide and the curing agents, and a pigment wherein at least 50 weight percent of the curing agent mixture is a 1:1 mole ratio adduct of rosin and maleic anhydride, said composition providing a matt finish on the surface of the article coated.

2. The composition of claim 1 wherein the second curing agent is dicyandiamide.

3. The composition of claim 2 wherein the curing agent mixture comprises from 50 to 85 weight percent of the rosin/maleic anhydride adduct and from 50 to 15 weight percent dicyandiamide.

4. The composition of claim 2 wherein the curing agent mixture comprises from 65 to 80 weight percent of the rosin/maleic anhydride adduct and from 35 to 20 weight percent dicyandiamide.

* * * * *

UNITED STATES PATENT OFFICE
CERTIFICATE OF CORRECTION

PATENT NO. : 4,528,127
DATED : July 9, 1985
INVENTOR(S) : Rolf Holderegger, Josef H. Jilek It is certified that error appears in the above-identified patent and that said Letters Patent are hereby corrected as shown below:

Column 5, line 13, the word "availablve" should read -- available --; line 30, "Down" should read -- Dow --.

In Table I, the data for Reverse, in-lb under Ex. 3 "(0.231" should read -- (0.23/ --.

Signed and Sealed this

Twenty-sixth Day of November 1985

[SEAL]

Attest:

DONALD J. QUIGG

Attesting Officer

Commissioner of Patents and Trademarks